J. H. HOWARD.
SAFETY TUG HOOK.
APPLICATION FILED APR. 12, 1920.
1,376,145.
Patented Apr. 26, 1921.
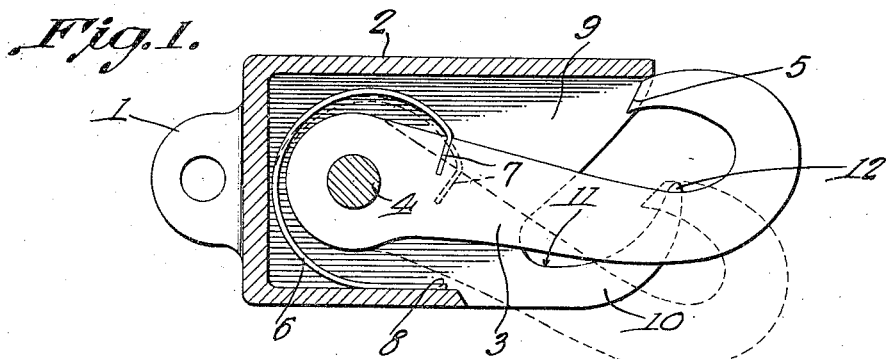
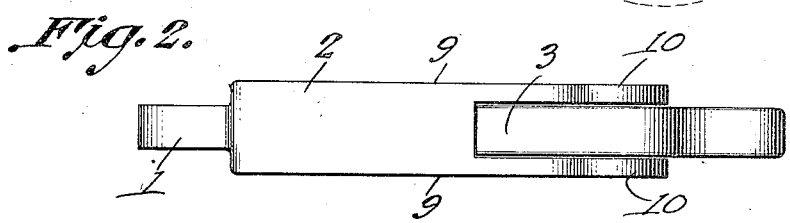
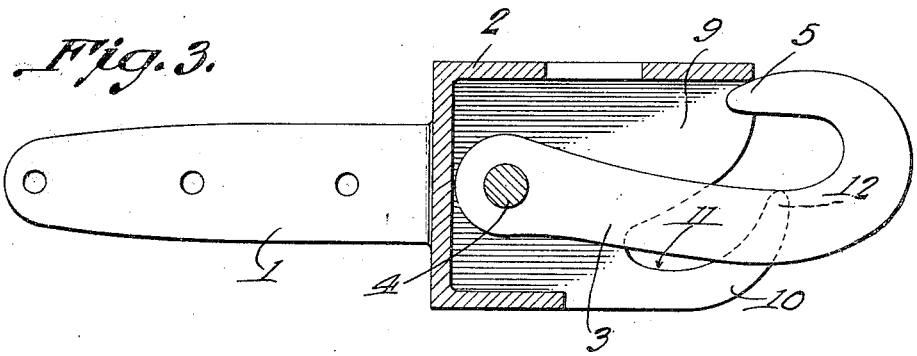
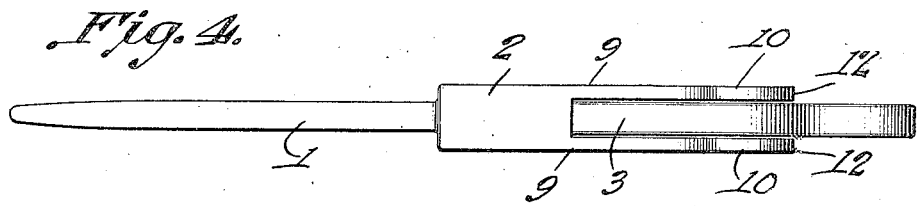
Inventor
John H. Howard
By Jerry A Mathews
and Lester L Sargent
Attorneys

UNITED STATES PATENT OFFICE.

JOHN H. HOWARD, OF COLFAX, WASHINGTON.

SAFETY TUG-HOOK.

1,376,145.   Specification of Letters Patent.   Patented Apr. 26, 1921.

Application filed April 12, 1920.  Serial No. 373,167.

*To all whom it may concern:*

Be it known that I, JOHN H. HOWARD, a citizen of the United States, and resident of Colfax, in the county of Whitman and State of Washington, have invented a new and useful Safety Tug-Hook, of which the following is a specification.

The object of my invention is to provide an improved tug hook for harness and other purposes which will in either its uppermost or lowermost position positively prevent accidental unfastening of the tug or ring engaged by it, and to provide a hook of this kind adapted for use either with a tug or as a butt chain hook or a doubletree or lead bar hook; and to provide novel means for normally retaining the hook in closed position.

I obtain the object of my invention by the mechanism described hereinafter and illustrated in the accompanying drawings, in which—

Figure 1 is a longitudinal section of the invention with the hook shown in elevation;

Fig. 2 is a bottom plan of Fig. 1;

Fig. 3 is a longitudinal section, partly in elevation, of a form of the hook designed to be attached to a tug; and Fig. 4 is a bottom plan of Fig. 3.

Referring to the accompanying drawings, I provide a suitable winged tug hook housing 2 having a suitable shank 1 which may be either of the form shown in Fig. 1, adapted for attachment to a hook; or of the form shown in Fig. 3, adapted to be attached to a harness tug.

Housing 2 is provided with sides or wings 9 which terminate in spaced arcuate tongues or extensions 10, thus forming openings 11, to receive the ring or hook to which the tug hook is fastened. Mounted by means of a pivot 4 secured to the wings 9 I provide a pivoted hook 3 having a tip 5 which normally extends just within the end of the housing 2, as shown in Figs. 1 and 3, when the hook is in taut position in use, and which, when in lowered position falls past and close to the tips 12 of the arcuate tongues or extensions 10. I may provide a spring 6 as shown in Fig. 1, having its end 8 secured to housing 2, as shown in Fig. 1 and having its other end 7 attached to or suitably inserted in the tug hook 5 to normally and resiliently hold the tug in the position shown in full line in Fig. 1, while permitting its swinging downward to the position shown by dotted lines.

The operation of the device is indicated in Fig. 1 of the drawings. Tongues 10 are so shaped relative to the end of tug hook 3 as to form a closure for the portion of the hook in which the ring or other portion of the harness to which the device is attached, thus forming a safety tug hook, which cannot become accidentally unclasped, on loosening of the portion of the harness to which it is hooked. In the form of the device in which a spring is employed, the spring operates to maintain the hook normally in closed position, as shown in Fig. 1. The hook is provided with the relatively large loop portion as illustrated in the drawings, and with an extended pointed end adapted to engage within the wings 9 of the housing 2 and within the spaced arcuate tongues 10.

Said hook can be used for different purposes, namely, said hook can be used on automobile chains and other appliances, and it can be placed on the end of a chain or cable and used at any work in which a hook is required; it can also be placed on breast-strops, halter chains, swingle-trees, lines and used in all those places advantageously; I do not want to limit the use of said hook to a harness tug alone, but want to use it anywhere, or upon any appliance upon which it can be used to advantage.

I claim:

1. In a device of the class described, a housing having a shank adapted to be attached to a suitable portion of the harness, the housing having spaced wings shaped to inclose the shank of a tug hook, a tug hook pivotally mounted within the wings of the housing and having its looped portion projecting beyond the housing, the wings having arcuate upwardly and forwardly projecting tongues, the device having openings between said tongues and the wings to permit of the insertion of the portion of the harness to which the hook is to be attached, the loop of the hook projecting beyond the wings, and the hook having a rearwardly turned end of a suitable length to engage just within the ends of the wings and of the arcuate tongues, said wings and tongues being positioned relative to the end of the hook to form a closure to prevent accidental detachment of the harness from the hook, substantially as shown and for the purposes described.

2. In a device of the class described, a tug hook housing having a shank adapted to be attached to a suitable part of the harness, the housing having extended side wings, a tug hook pivotally mounted within said side wings and adapted to swing from horizontal to a depending position, the side wings having arcuate upwardly and forwardly extending tongues to provide, with the wings, an opening for the reception of the portion of the harness to which the hook is to be engaged, said tongues also being positioned to serve as a safety closure for the loop portion of the hook as same is swung downwardly, whereby the harness engaged by the hook cannot become accidentally disengaged, substantially as shown.

3. In combination with the device described in claim 1 resilient means mounted in the housing encircling the pivoted portion of the hook and connected with the hook for normally holding the hook in closed position, substantially as and for the purpose described.

JOHN H. HOWARD.